May 9, 1944.     G. J. KOEHLER     2,348,548
FLUID VALVE
Filed Aug. 5, 1942
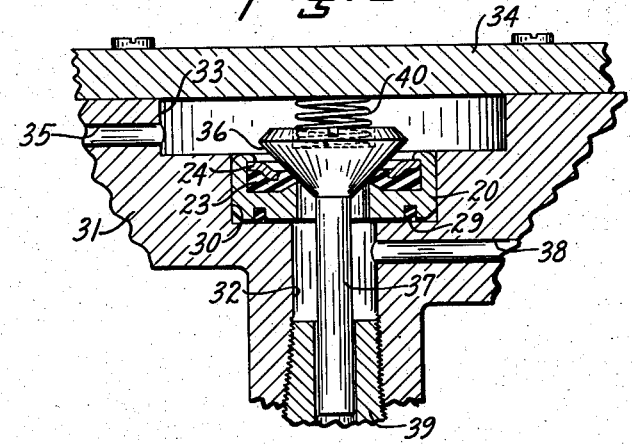
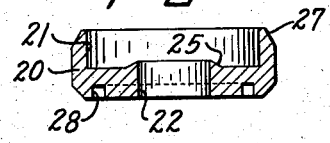
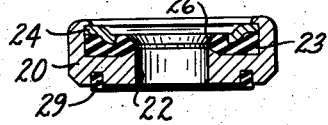
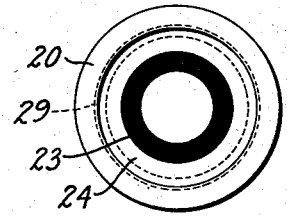
INVENTOR
GUSTAVE J. KOEHLER
BY Richard Van Buren
HIS ATTORNEY Patented May 9, 1944

2,348,548

UNITED STATES PATENT OFFICE 2,348,548

FLUID VALVE

Gustave J. Koehler, Dayton, Ohio

Application August 5, 1942, Serial No. 453,629

3 Claims. (Cl. 251—167)

The present invention relates to fluid flow control valves and is particularly directed to a novel seat structure for such valves.

One object of the present invention is the provision of a novel valve for use in controlling the flow of fluids.

Another object is to provide a removable valve seat for use in fluid control valves.

Still another object is to provide a leak-proof, removable valve seat for use in fluid control valves.

A further object is to supply a leak-proof, removable valve seat for use in fluid control valves, comprising a main member supporting a plastic valve seat for engagement by the valve plug and a plastic ring for sealing the removable seat in the valve body or casing.

With these and incidental objects in view, the invention includes certain novel features of construction and combinations of parts, the essential elements of which are set forth in appended claims and a preferred form or embodiment of which is hereinafter described with reference to the drawing which accompany and form a part of this specification.

In the drawing:

Fig. 1 is a sectional view, with parts in elevation, showing a fluid valve embodying the novel valve seat of this invention.

Fig. 2 is a sectional view of the cylindrical body portion of the valve seat.

Fig. 3 is a sectional view of the retaining washer for the valve seat.

Fig. 4 is a sectional view of the plastic seat washer for the valve seat.

Fig. 5 is a sectional view of the complete valve seat.

Fig. 6 is a top plan view of the complete valve seat.

Description

Referring to the figures of the drawing, the present invention is directed to a novel removable valve seat comprising a cylindrical body portion 20 having a counter-boring 21 in axial alinement with a central boring 22, in said body portion. A plastic seat washer 23 fits freely in the counter-boring 21, as also does a retaining washer 24, which washer is adapted to clamp the seat washer 23 against the bottom of the counter-boring.

In assembling the valve seat, the plastic seat washer 23 is first placed in the counter-boring 21, the retaining washer 24 is then placed in said counter-boring, after which the upper edge of the body portion is crimped or spun over said retaining washer 24 to cause said washer to compress the plastic seat washer 23 firmly between said retaining washer and the bottom of the counter-boring 21.

Compressing the seat washer 23 causes a cone-shaped surface 25 formed on the bottom of the counter-boring 21 adjacent the central boring 22, in cooperation with a depressed central portion of the retaining washer 24 to flare the central portion of said seat washer 23 upwardly to form a tapered valve seat surface 26 (Fig. 5) out of the periphery of the hole in said seat washer.

It is the usual practice to further improve the valve seat surface 26 by grinding said surface with a conical grinding wheel traveling at a comparatively high rate of speed.

It will be noted that the upper edge of the cylindrical body portion 20 is tapered at 27 (Fig. 2) to facilitate the crimping thereof.

The bottom surface of the cylindrical body portion 20 has a ring-shaped groove 28 therein adapted to receive a plastic sealing ring 29.

The complete removable valve seat is adapted to be pressed into a counter-boring 30 (Fig. 1) in a main valve casing 31, said counter-boring being in axial alinement with a central boring 32 in said casing. In pressing the valve seat into the counter-boring 30, the plastic sealing ring 29 is forced into yieldable contact with the bottom of said counter-boring 30 to form a fluid seal between the removable valve seat and the casing 31.

Another counter-boring 33 (Fig. 1) in the casing 31 connects with the counter-boring 30 and is sealed against leakage by a cover 34 secured by a plurality of screws to said casing 31, to form a fluid chamber connected by an inlet opening 35 to a suitable source of supply.

A conical surface 36 on the head of a valve plug 37 cooperates with the surface 26 on the seat washer 23 to control the flow of fluid from the chamber formed by the counter-boring 33, to the boring 32 and thence through an outlet opening 38 to a source of demand.

A tenon on the valve plug 37 is a slip fit in a guide boring in a screw plug 39 threaded in the bottom of the boring 32. A compressible spring 40 is compressed between the bottom of a boring in the head of the valve plug 37 and the bottom of the cover 34 to yieldingly urge the conical surface 36 into engagement with the surface 26 of the seat washer 23.

Any suitable means may be employed for raising the valve plug 37 to control the flow of fluid through the valve. For example, a cam arrangement, or linkage, may be arranged to cooperate with the tenon of the valve plug 37 to control the operation of said valve plug, or said valve plug may be controlled electrically, if desired, by employing a solenoid to cooperate with an armature connected to the head portion of said valve plug 37.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. A removable valve seat comprising a cylindrical body portion having a central boring and a counter-boring therein; a plastic washer in the counter-boring; and a washer retaining element in the counter-boring, said body portion adjacent the counter-boring being crimped or spun over the retaining element to cause said element to firmly press the washer against the bottom of the counter-boring in such a manner as to form a valve-seating surface out of the periphery of the hole in said plastic washer.

2. A self-contained seat for a sensitive fluid valve comprising, a cylindrical body portion having a central bore and a counter-bore in axial alinement, the bottom of the counter-bore adjacent the bore being cone-shaped upwardly of the bottom; a flat plastic washer fitted in the counter-bore; and a cup-shaped retaining washer fitted in the counter-bore with the cupped portion thereof adjacent the plastic washer, the upper edge of said body portion being crimped or spun over the retaining washer to cause the cupped portion thereof to press the plastic washer against the cone-shaped bottom of the counter-bore in such a manner as to flare the inner portion of said plastic washer upwardly to form a conical valve seating surface out of the periphery of the hole therein.

3. A self-contained valve seat for insertion in a counter-boring in a main portion of a sensitive fluid valve, said valve seat being sealed against leakage in said counter-boring and comprising a cylindrical body portion having a central bore and a counter-bore in axial alinement, the bottom of the counter-bore adjacent the bore being cone-shaped upwardly of the bottom; a flat plastic washer fitted in the counter-bore; and a cup-shaped retaining washer fitted in the counter-bore with the cupper portion thereof adjacent the plastic washer, the upper edge of said body portion being crimped or spun over the retaining washer to cause the cupped portion to impress the plastic washer against the cone-shaped bottom of the counter-bore in such a manner as to flare the inner portion of said plastic washer upwardly to form a conical valve seating surface out of the periphery of the hole therein.

GUSTAVE J. KOEHLER.